(12) United States Patent
Calvarese

(10) Patent No.: US 11,347,950 B2
(45) Date of Patent: May 31, 2022

(54) EVENT NOTIFICATION BASED ON EDITING A TRANSPONDER IDENTIFIER

(71) Applicant: ZEBRA TECHNOLOGIES CORPORATION, Lincolnshire, IL (US)

(72) Inventor: Russell Calvarese, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/011,527

(22) Filed: Sep. 3, 2020

(65) Prior Publication Data

US 2022/0067315 A1 Mar. 3, 2022

(51) Int. Cl.
*G06K 7/10* (2006.01)

(52) U.S. Cl.
CPC ..... *G06K 7/10405* (2013.01); *G06K 7/10198* (2013.01); *G06K 7/10297* (2013.01)

(58) Field of Classification Search
CPC .......... G06K 7/10405; G06K 7/10297; G06K 7/10198; G06K 19/0716; G06K 19/0717; G06K 19/0723
USPC ............ 340/10.1, 10.32, 10.51, 10.52, 572.1
See application file for complete search history.

(56) References Cited

U.S. PATENT DOCUMENTS

| | | | | |
|---|---|---|---|---|
| 5,887,176 A | * | 3/1999 | Griffith | G06Q 20/203 |
| | | | | 713/320 |
| 6,025,780 A | * | 2/2000 | Bowers | G06K 19/0701 |
| | | | | 340/572.3 |
| 6,617,963 B1 | * | 9/2003 | Watters | G01D 5/48 |
| | | | | 340/10.41 |
| 2007/0024424 A1 | * | 2/2007 | Powell | G06K 7/10019 |
| | | | | 340/10.1 |
| 2007/0069866 A1 | * | 3/2007 | Schuessler | H04B 5/0056 |
| | | | | 340/10.4 |
| 2008/0079582 A1 | * | 4/2008 | Alexis | G08B 13/248 |
| | | | | 340/572.1 |
| 2012/0326844 A1 | * | 12/2012 | Blaignan | G06K 19/0723 |
| | | | | 340/10.1 |
| 2014/0149079 A1 | * | 5/2014 | Shin | G06K 19/0717 |
| | | | | 702/187 |
| 2015/0347791 A1 | * | 12/2015 | Desai | G06K 19/0709 |
| | | | | 340/10.1 |

* cited by examiner

*Primary Examiner* — Edwin C Holloway, III

(57) ABSTRACT

A system for event notification based on editing a transponder identifier is disclosed herein. The system may include a sensor system, a transponder, a transponder reader, and a controller. The system may detect an event associated with a sensor. The system may identify a transponder associated with the sensor. The system may cause the transponder to store an event identifier in a memory location of an identifier, of the transponder, to form an edited identifier. The event identifier may be associated with the event. The system may determine that the transponder responded to the query from the transponder reader. The system may store a confirmation that the event identifier was provided to the transponder reader via the transponder.

20 Claims, 6 Drawing Sheets

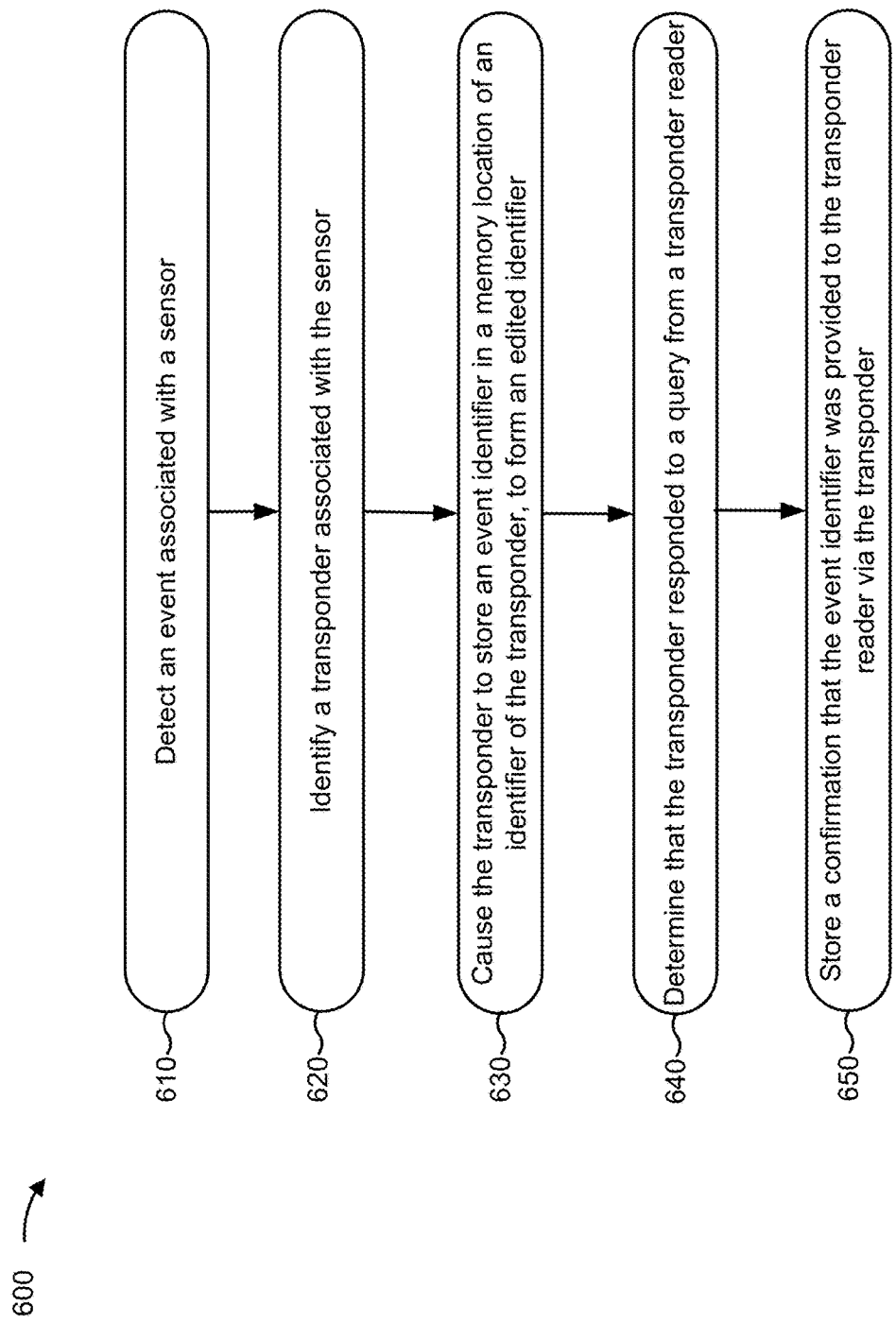

US 11,347,950 B2

EVENT NOTIFICATION BASED ON EDITING A TRANSPONDER IDENTIFIER

BACKGROUND

Radio frequency identification (RFID) refers to a system that includes an RFID transponder and an RFID reader. The RFID reader may include one or more antennas that emit radio waves and receive signals back from the RFID transponder. The RFID transponder may use radio waves to communicate information to the RFID reader.

The RFID transponder may include a wired data port to allow its identifier to be modified by a control system connected to the RFID transponder. This mechanism can be used as a backhaul to transfer information between the control system and the RFID reader. However, the system may require large amounts of data to be transmitted via the backhaul, such as firmware updates. The low bandwidth of the RF link between the RFID transponder and the RFID reader may cause the transfer of large amounts of data to take a relatively long period of time. Therefore, there is a need to maximize the transfer efficiency for an RFID system. In addition, various events generated by the control system, in response to state changes of sensors connected to the control system, need various levels or prioritization for prompt transfer or critical events.

SUMMARY

In some implementations, a method includes receiving, by a transponder, an event identifier that is associated with an event of a system; storing, by the transponder, the event identifier to a memory location associated with an identifier of the transponder, to form an edited identifier, receiving, by the transponder, a query; and transmitting, by the transponder and based on the query, a portion of the edited identifier.

In some implementations, a device includes one or more memories; and one or more processors, communicatively coupled to the one or more memories, configured to: detect an event associated with a sensor; identify a transponder associated with the sensor; cause the transponder to store an event identifier in a memory location of an identifier, of the transponder, to form an edited identifier, wherein the event identifier is associated with the event; determine that the transponder responded to a query from a transponder reader; and store a confirmation that the event identifier was provided to the transponder reader via the transponder.

In some implementations, a system includes a sensor system configured to generate sensor readings associated with an object; a transponder associated with the object, wherein the transponder is configured to transmit an identifier; a transponder reader that is configured to query the transponder reader using the identifier; and a controller configured to: detect, based on the sensor readings, an event associated with the object; edit the identifier, of the transponder, to form an edited identifier that includes an event identifier that is associated with the event; determine that the transponder reader received the event identifier from the transponder; and return the edited identifier to the identifier.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

FIG. 6 is a flowchart of an example processes relating to event notification based on editing a transponder identifier.

Figure 1:
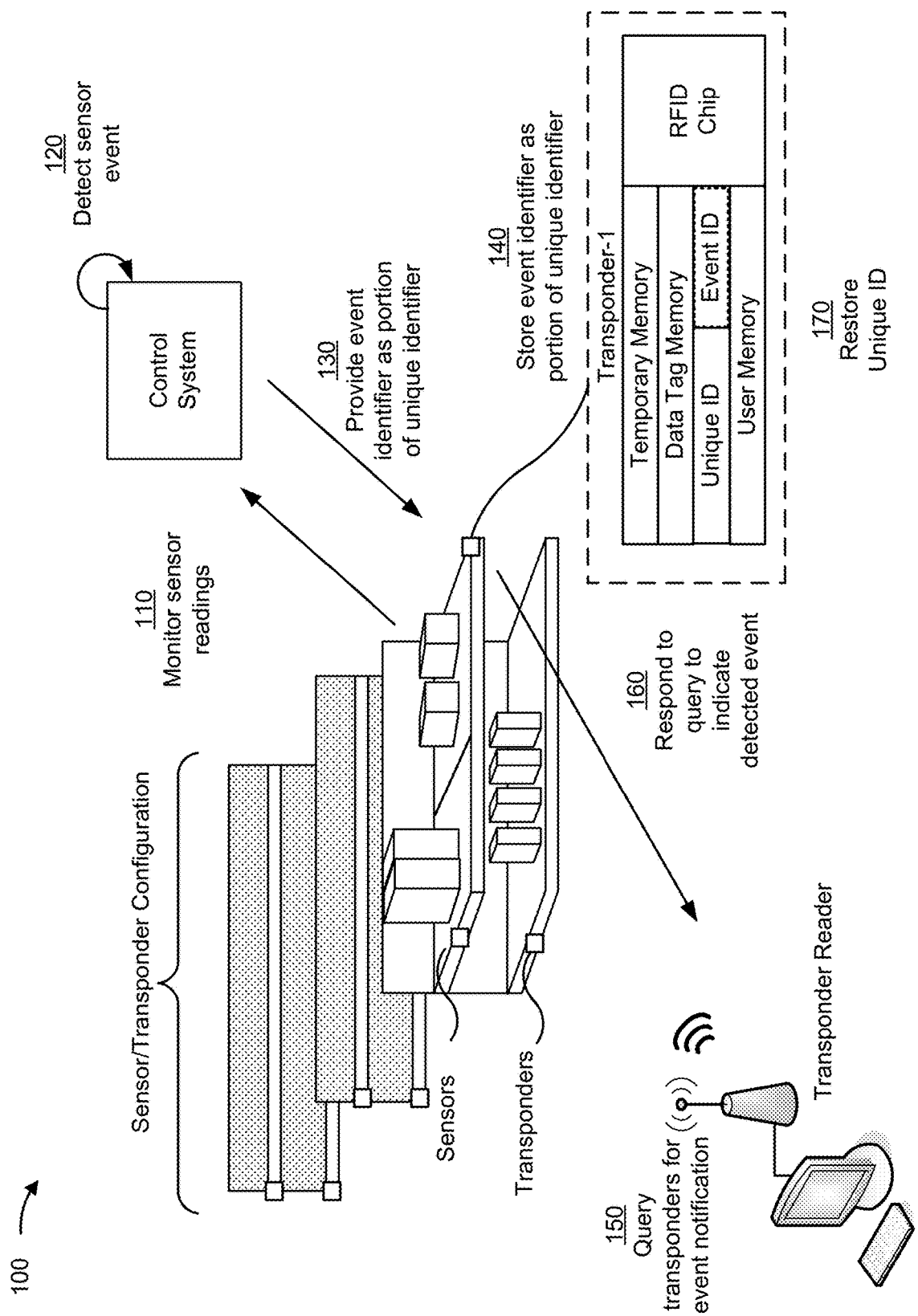
FIG. 1 is a diagram of an example implementation described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Radio frequency identification (RFID) refers to a system that includes an RFID transponder and an RFID reader. The RFID reader may include one or more antennas that emit radio waves and receive signals back from the RFID transponder. The RFID transponder may use radio waves to communicate information to the RFID reader.

The RFID transponder may include a wired data port that is used as part of a backhaul for the system. However, the system may require large amounts of data and/or data that requires retries, acknowledgements, packet counts, check sums, and/or the like to be transmitted via the backhaul, such as firmware updates. The low bandwidth of the RF link between the transponder and the RFID reader may cause the transfer of this data to take a relatively long period of time relative to other methods for transferring the data (e.g., Ethernet, fiber optic, and/or the like).

Further, the RFID transponder may have data with multiple priority levels (e.g., data that is to be transmitted prior to other data) that is to be transmitted to the RFID reader. For example, the RFID transponder may have an event notification to be transmitted to the RFID reader. The event notification may include information indicating the occurrence of an event. To ensure adequate time for performing an action related to the event, the event notification should be transmitted to the RFID reader prior to other data. Although the RFID reader may set priorities for transferring data by setting an electronic product code (EPC) mask and allocating a portion of time to read data from a particular set of RFID transponders, the RFID transponder is unable to set the priority for event notification to enable the event notification to be transmitted prior to other data. As a result, the RFID reader may not receive the event notification and/or may be unable to perform a required action in response to the occurrence of the event in a timely manner. In this way, the RFID reader may waste computing resources (e.g., processing resources, memory resources, communication resources, and/or the like) associated with failing to perform the required action in a timely manner.

Some implementations described herein related to a system for event notification based on editing a transponder identifier. In some implementations, the system may include a sensor system, a transponder, a transponder reader, and a controller. The system may detect an event associated with a sensor. The system may identify a transponder associated with the sensor. The system may cause the transponder to store an event identifier in a memory location of an identifier, of the transponder, to form an edited identifier. The event identifier may be associated with the event. The transponder reader may utilize an identifier mask to query transponders included in the system. The identifier mask may correspond to the event identifier stored in the memory location of the identifier of the transponder. In this way, the transponder may set the priority for data to be transmitted to the transponder reader by the transponder.

FIG. 1 is a diagram of an example implementation 100 described herein. As shown in FIG. 1, a control system is associated with a plurality of sensors positioned on a plurality of shelves, a plurality of transponders associated with the plurality of sensors, and a transponder reader.

A sensor, of the plurality of sensors, may be configured to obtain sensor data associated with objects located on a shelf, of the plurality of shelves, associated with the sensor. For example, the sensor data may obtain sensor data indicating a placement of an object on the shelf, a removal of an object from the shelf, and/or the like.

The control system may be configured to receive sensor data obtained by the plurality of sensors. The control system may analyze the sensor data to determine an occurrence of an event. For example, the control system may analyze the sensor data to detect a sweep event, a tamper event, an inventory event, and/or the like. The sweep event may be an event associated with a removal of a large percentage (e.g., 100%, 95%, and/or the like) of objects from a shelf within a short period of time (e.g., twenty seconds, thirty seconds, one minute, and/or the like). The tamper event may be an event associated with a person tampering with and/or disabling a sensor and/or a transponder. The inventory event may be an event associated with an object being placed on the shelf, an event associated with an object being removed from the shelf, and/or the like. The control system may provide information associated with the occurrence of the event to the transponder, as described herein.

A transponder, of the plurality of transponders, may be configured to provide information to and/or receive information from the control system, as described herein. For example, the transponder may be an RFID transponder that is communicatively coupled to the control system via an interface (e.g., an inter-integrated circuit (I²C) interface) of the transponder. Alternatively, and/or additionally, the transponder may be configured to provide information associated with an occurrence of an event to the transponder reader, as described herein.

In some implementations, the transponder is associated with an object located on a shelf. For example, the transponder may be attached to, embedded within, and/or the like an object located on a shelf. In some implementations, the transponder is attached to, embedded within, and/or the like a shelf.

The transponder reader may be configured to query the plurality of transponders and to receive information from the plurality of transponders in response to the query. For example, the transponder reader may be an RFID transponder reader that queries the plurality of transponders and receives information from the plurality of transponders based on transmitting the query.

As shown by reference number 110, the control system monitors sensor readings of the plurality of sensors. The control system may obtain sensor readings from the plurality of sensors. For example, the plurality of sensors may periodically transmit sensor readings to the control system, the plurality of sensors may transmit sensor readings to the control system based on an occurrence of a sensor event, the plurality of shelf sensors may transmit sensor readings to the control system based on receiving a request from the control system, and/or the like. The sensor readings may include information indicating a quantity of objects located on a shelf, of the plurality of shelves, information indicating a weight of an object located on the shelf, information indicating a total weight of a group of objects located on the shelf, information identifying a transponder associated with an object located on the shelf, and/or the like.

As shown by reference number 120, the control system detects a sensor event. For example, the control system may detect a sweep event, a tamper event, an inventory event, and/or the like. The control system may detect an occurrence of a sweep event when the sensor readings of a shelf sensor indicate that a quantity of objects removed from a shelf associated with the shelf sensor within an amount of time (e.g., thirty seconds, one minute, and/or the like) satisfies a threshold quantity.

The control system may detect the sensor event based on monitoring the sensor readings of the plurality of sensors. In some implementations, the control system detects the sensor event based on comparing the sensor reading and a threshold associated with the sensor event and determining that the sensor reading satisfies the threshold based on the comparison. As an example, the sensor reading may indicate a current quantity of objects located on a shelf associated with the sensor. The control system may determine a quantity of objects removed from the shelf during a period of time based on a previous sensor reading obtained from the sensor. The control system may determine that the quantity of objects removed from the shelf during the period of time satisfies a threshold quantity. The control system may detect the sensor event (e.g., a sweep event) based on the quantity of objects removed from the shelf during the period of time satisfying the threshold quantity.

As an example, the control system may periodically obtain the sensor readings from the plurality of sensors. The control system may obtain first sensor readings at a first time. The first sensor readings may include data indicating a first quantity of objects located on a shelf, of the plurality of shelfs. In some implementations, the sensor data includes information identifying a total weight of objects located on the shelf. The control system may determine the first quantity of objects located on the shelf based on the total weight.

As an example, the sensor data may include information identifying a sensor and/or a shelf associated with the sensor data (e.g., a sensor identifier, a shelf identifier, a transponder identifier, and/or the like). The control system may determine a type of object associated with the sensor and/or the shelf. For example, the control system may determine the type of object associated with the sensor and/or the shelf based on information stored in a data structure (e.g., a database, a table, a list, and/or the like) that maps identifiers (e.g., sensor identifiers, shelf identifiers, transponder identifiers, and/or the like) to types of objects. The control system may determine a weight associated with the type of object based on information stored in a data structure that maps types of objects to information identifying weights of the types of objects. The control system may determine the first quantity of objects located on the shelf based on the total weight and the weight of the type of object. For example, the control system may determine the first quantity of objects located on the shelf based on dividing the total weight by the weight of the type of object.

The control system may store information identifying the first quantity of objects, information identifying the shelf, information identifying the total weight, and/or the like in a memory associated with the control system. The control system may receive second sensor readings at a second time. The second sensor readings may include information identifying a second quantity of objects located on the shelf. The control system may determine a third quantity of objects removed from the shelf based on the first quantity of objects and the second quantity of objects. The control system may determine that the third quantity of objects satisfies a threshold quantity of objects.

The control system may determine an amount of time associated with the third quantity of objects being removed from the shelf based on the first time and the second time. The control system may determine that the amount of time satisfies a threshold amount of time. The control system may determine the occurrence of the sweep event based on the third quantity of objects satisfying the threshold quantity of objects and/or the amount of time satisfying the threshold amount of time.

The control system may detect an occurrence of a tamper event when the sensor readings of a shelf sensor indicate that the shelf sensor and/or a transponder associated with the shelf sensor have been tampered with. For example, the control system may determine that the sensor readings indicate that a case of the transponder has been opened, that the case of the shelf sensor has been opened, that an energy harvesting cell of the transponder has been covered or otherwise prevented from harvesting energy, that a power supply of the transponder has been disconnected or removed, and/or the like.

The control system may detect an occurrence of an inventory event when the sensor readings of a shelf sensor indicate a change in a quantity of objects located on the shelf associated with the shelf sensor. For example, the control system may detect the occurrence of an inventory event when the sensor readings indicate that a quantity of objects located on the shelf has increased, that the quantity of objects located on the shelf has decreased, and/or the like.

In some implementations, the sensor readings indicate that the quantity of objects located on the shelf has decreased and the control system determines whether the quantity of objects decreasing corresponds to an inventory event or an inventory invent. The control system may determine that the sensor readings indicate an inventory event when a quantity of objects removed from the shelf fails to satisfy a threshold quantity, when the quantity of objects are removed within an amount of time that fails to satisfy a threshold amount of time, and/or the like. The control system may determine that the sensor readings indicate a sweep event in a manner similar to that described above.

As shown by reference number 130, the control system provides an event identifier as a portion of a unique identifier to a transponder. The event identifier may include information identifying a type of sensor event detected by the control system. In some implementations, the event identifier includes a set of one or more bits of data. For example, the event identifier may include a series of bits. The series of bits may comprise a first value to indicate that a sensor event was not detected, a second value to indicate that a first type of sensor event was detected (e.g., a sweep event), a third value to indicate that a second type of sensor event was detected (e.g., a tamper event), and/or the like. The control system may determine the event identifier based on a type of the sensor event.

In some implementations, the event identifier may indicate a sensor associated with the sensor event. For example, the control system may identify a sensor associated with the sensor event based on information included in the sensor readings. The control system may set a bit, of the series of bits, to indicate the identified sensor.

In some implementations, the event identifier may indicate a transponder associated with the sensor. The control system may identify a transponder associated with the sensor based on information stored in a data structure mapping sensors to transponders associated with the sensors (e.g., a transponder associated with a shelf that is associated with the sensor). The control system may set a bit, of the series of bits, to identify the transponder associated with the sensor. The control system may provide the event identifier to the transponder based on the transponder being associated with the shelf sensor and based on the shelf sensor being associated with the sensor event.

As shown by reference number 140, the transponder stores the event identifier as a portion of a unique identifier of the transponder. The transponder may store the event identifier as a portion of the unique identifier to indicate that the sensor associated with the transponder detected the sensor event associated with the event notification. In some implementations, the transponder stores the event identifier to a memory location associated with the unique identifier to form an edited identifier.

In some implementations, the transponder comprises an RFID transponder and the unique identifier comprises a rewriteable unique identifier of the RFID transponder, such as an electronic product code (EPC). The transponder may store the event identifier as a last portion of the unique identifier, a first portion of the unique identifier, and/or the like. For example, the event identifier may comprise a series of three bits. The transponder may overwrite the last three bits of the unique identifier with the series of three bits of the event identifier to store the event identifier as a portion of the unique identifier of the transponder, as described in greater detail below with respect to FIG. 2. In some implementations, prior to overwriting the particular portion of the unique identifier, the transponder may store a copy of the particular portion of the unique identifier in a memory of the transponder.

In some implementations, the transponder stores event data associated with the event notification in a reconfigurable memory of the transponder. The event data may include information identifying the sensor associated with the event, the shelf associated with the event, a time of the occurrence of the event, and/or the like.

As shown by reference number 150, the transponder reader queries the transponders for an event notification. In some implementations, the transponder reader queries the transponders based on a schedule. The schedule may indicate that the transponder reader is to periodically (e.g., every one minute, every two minutes, every ten minutes, and/or the like) query the transponders for any event notifications, periodically query the transponders for a particular event notification, and/or the like. In some implementations, the transponder reader queries the transponders based on a priority scheme associated with a plurality of different types of events. The transponder reader may determine an event, of the plurality of different types of events, having a highest priority relative to other events of the plurality of different types of events based on the priority scheme. The transponder reader may query the transponders for an event notification associated with the event based on the event having the highest priority relative to the other events. The transponder reader may query the transponders for event notifications associated with each of the different types of events based on the respective priorities of the different types of events.

In some implementations, the transponder reader may query the transponders by transmitting a masking query. The masking query may include a truncation identifier and an event identifier. The event identifier may be included in a portion of the masking query that corresponds to the portion of the edited identifier that includes the event identifier.

As shown by reference number 160, the transponder responds to the query to indicate the detected event. In some implementations, the query includes a portion of the edited identifier that does not include the event notification. The transponder may respond to the query by transmitting the portion of the edited identifier that includes the event identifier to the transponder reader. The transponder reader may receive the portion of the edited identifier from the transponder. The transponder reader may reconstruct the edited identifier based on the truncation identifier. For example, the transponder reader may combine the portion of the edited identifier and the truncation identifier to form the edited identifier.

The transponder reader may determine that the transponder is associated with the occurrence of the event based on reconstructing the edited identifier. In some implementations, the transponder reader requests the event data from the transponder based on determining that the transponder is associated with the occurrence of the event. The transponder may transmit the event data to the transponder reader based on the request. In some implementations, the transponder transmits the event data to the transponder reader based on responding to the query.

Alternatively, and/or additionally, the transponder may transmit a second portion of the edited identifier to the transponder reader. The second portion of the edited identifier may indicate that the sensor associated with the transponder detected the sensor event associated with the event notification.

In some implementations, the transponder reader provides information associated with the occurrence of the event via a user device. For example, the transponder reader may provide a notification to the user device to cause the user device to display the notification to a user. The notification may include information indicating the occurrence of the event, information identifying a type of the event, information identifying the transponder, information identifying the sensor, information identifying the shelf, the event information, and/or the like.

As shown by reference number 170, the transponder restores the unique identifier. The transponder may restore the unique identifier by overwriting the portion of the edited identifier that includes the event notification with the copy of the particular portion of the unique identifier (e.g., the portion of the unique identifier that was overwritten by the event notification) that is stored in the memory of the transponder.

The control system may determine that the transponder restored the unique identifier. For example, the control system may read the memory location storing the unique identifier and may determine that the unique identifier is restored based on reading the memory location. The control system may store information indicating that the event identifier was provided to the transponder reader based on determining that the transponder restored the unique identifier.

In some implementations, the transponder restores the unique identifier based on transmitting the event notification to the transponder reader. As an example, the event identifier may include information indicating that the transponder is to restore the unique identifier based on transmitting the event notification to the transponder reader. For example, the event identifier may include a first portion of data and a second portion of data. The first portion of data may indicate the sensor event. The second portion of data may indicate whether the transponder is to restore the unique identifier based on transmitting the event notification. For example, the second portion of data may include a bit that may be set to a first value (e.g., 1) when the transponder is to restore the unique identifier based on transmitting the event notification. The bit may be set to a second value (e.g., 0) when the transponder is not to restore the unique identifier based on transmitting the event notification. For example, the bit may be set to the second value when the transponder is to restore the unique identifier based on receiving an acknowledgment or a reset message, as described below.

In some implementations, the transponder restores the unique identifier based on an expiration of a period of time. As an example, the transponder may initiate a timer based on transmitting the event notification to the transponder reader. The transponder may determine an expiration of the period of time based on the timer. The transponder may restore the unique identifier based on the expiration of the period of time.

In some implementations, the transponder restores the unique identifier based on receiving an acknowledgement. For example, the transponder reader may transmit an acknowledgment to the transponder based on receiving the event notification from the transponder.

In some implementations, the transponder restores the unique identifier based on a reset notification. The reset notification may include information indicating that the transponder is to restore the unique identifier, the unique identifier, the portion of the unique identifier that was overwritten with the event notification, and/or the like.

In some implementations, the transponder receives the reset notification from the transponder reader. For example, the transponder reader may transmit the reset notification to the transponder based on receiving the event notification from the transponder.

In some implementations, the transponder receives the reset notification from the control system. In some implementations, the control system transmits the reset notification to the transponder based on determining that the transponder reader received the event notification from the transponder. As an example, the transponder reader may transmit a message to the control system based on receiving the event notification. The control system may determine that the transponder reader received the event notification based on the message. The control system may transmit the reset notification to the transponder based on determining that the transponder reader received the event notification.

In some implementations, the control system transmits the reset notification based on determining that the transponder transmitted the event notification to the transponder reader. In some implementations, the control system determines that the transponder transmitted the event notification to the transponder reader based on information received from the transponder. As an example, the transponder may transmit a message indicating that the transponder transmitted the event notification to the transponder reader to the control system. The control system may transmit the reset notification to the transponder based on receiving the message from the transponder.

In some implementations, the control system determines that the transponder transmitted the event notification based on a schedule associated with the transponder reader querying the transponders. The control system may determine that the transponder reader queried the transponder based on the schedule. The control system may determine that the event notification was provided to the transponder based on information stored in a data structure indicating transponders to which event notifications were provided prior to being queried by the transponder reader. The control system may determine that the transponder transmitted the event notification based on the event notification being provided to the transponder prior to the transponder reader querying the transponders.

In some implementations, the control system transmits the reset notification based on an expiration of a period of time. The period of time may be based on a time at which the event notification was provided to the transponder, a time at which the transponder reader transmitted the query, a time at which the transponder transmitted the event notification to the transponder reader, a frequency at which the transponder reader queries the transponders, and/or the like.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
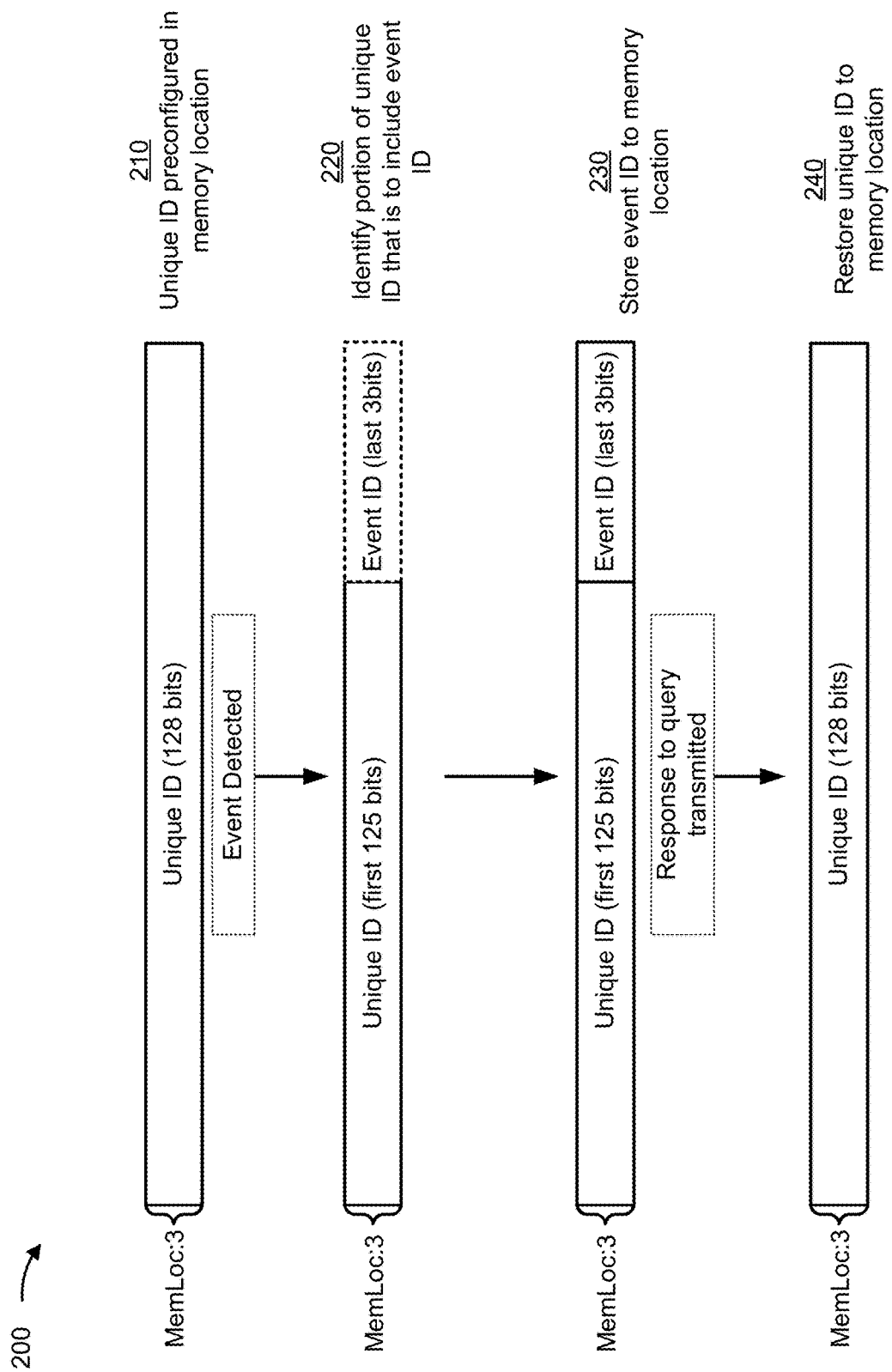
FIG. 2 is a diagram of another example implementation described herein.

FIG. 2 is a diagram of an example implementation 200 described herein. As shown in FIG. 2, a transponder includes a unique identifier stored in a memory of the transponder. As shown by reference number 210, the unique identifier is preconfigured in a memory location of the transponder (e.g., MemLoc:3, as shown in FIG. 2). For example, the transponder may store an EPC number that uniquely identifies the transponder in the memory of the transponder.

As shown in FIG. 2, an event may be detected. For example, the control system may detect an occurrence of an event based on sensor readings obtained from a sensor associated with the transponder. The control system may identify the transponder as being associated with the sensor and may provide the event identifier to the transponder, in a manner similar to that described above with respect to FIG. 1.

As shown by reference number 220, the transponder identifies a portion of the unique identifier that is to include the event identifier. The transponder may receive the event identifier from the control system. The transponder may identify the portion of the unique identifier that is to include the event identifier based on receiving the event identifier from the control system.

In some implementations, a size of the portion of the unique identifier that is to include the event identifier corresponds to a size of the event identifier. As an example, the transponder may determine that the event identifier comprises a particular quantity of bits of data. The transponder may identify a portion of the unique identifier comprising the particular quantity of bits of data as the portion that is to include the event identifier.

As shown in FIG. 2, the unique identifier includes 128 bits of data. The transponder may determine that the event identifier comprises three bits of data. The transponder may identify the last three bits of data of the unique identifier as the portion of the unique identifier that is to include the event identifier based on the event identifier comprising three bits of data.

In some implementations, the portion of the unique identifier may be larger than a size of the event identifier. For example, the transponder may pad the event identifier (e.g., add a set of zeros to the event identifier). The transponder may identify a portion of the unique identifier having a size corresponding to a size of the padded event identifier. As another example, the transponder may add priority information to the event identifier. For example, the transponder may add information corresponding to a mask utilized by a transponder reader to query transponders for prioritized data to the event identifier.

In some implementations, the portion of the unique identifier may be smaller than a size of the event identifier. For example, the transponder may form a reduced event identifier by removing one or more leading zeros, compressing the event identifier, and/or the like. The transponder may identify a portion of the unique identifier having a size corresponding to the size of the reduced event identifier.

As shown by reference number 230, the transponder stores the event identifier to the memory location. The transponder may store the event identifier to the memory location by overwriting the identified portion of the unique identifier. In some implementations, the transponder may store a copy of the identified portion of the unique identifier in the memory. The transponder may store the copy of the identified portion of the unique identifier to enable the transponder to restore the unique identifier, as described below.

As shown in FIG. 2, the transponder transmits a response to a query received from the transponder reader. The transponder may receive a query from a transponder reader. In some implementations, the transponder may receive the query in a manner similar to that described above with respect to FIG. 1. The transponder may transmit a response to the transponder reader based on receiving the query. The response may include the event identifier, information associated with an event associated with the event identifier, and/or the like. In some implementations, the transponder may transmit the response to the query in a manner similar to that described above with respect to FIG. 1.

As shown by reference number 240, the transponder restores the unique identifier to the memory location. For example, the transponder may obtain the copy of the identified portion of the unique identifier from the memory based on transmitting the response to the transponder reader. The transponder may overwrite the event identifier with the copy of the identified portion of the unique identifier to restore the unique identifier.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
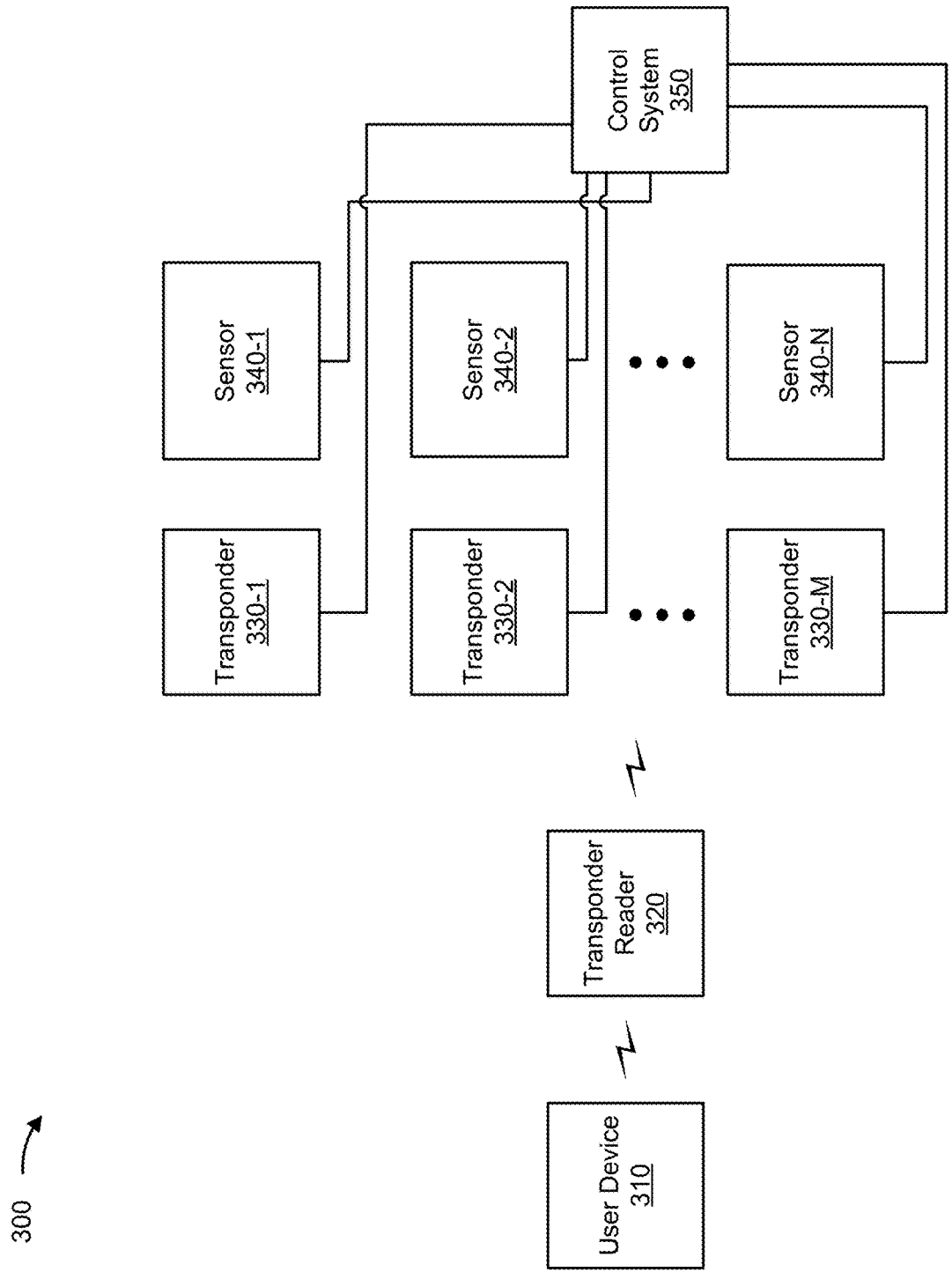
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a transponder reader 320, a transponders 330-1 through 330-M (referred to collectively as "transponders 330" and individually as "transponder 330"), sensors 340-1 through 340-N (referred to collectively as "sensors 340" and individually as "sensor 340"), and a control system 350. Devices of environment 300 may interconnect via wired connections, wireless connections, or a combination of wired and wireless connections.

The user device 310 includes one or more devices capable of receiving, generating, storing, processing, and/or providing information associated with an event notification, as described elsewhere herein. The user device 310 may include a communication device and/or a computing device. For example, the user device 310 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 310 may communicate with one or more other devices of environment 300, as described elsewhere herein.

The transponder reader 320 includes one or more devices capable of receiving, generating, storing, processing, and/or providing information associated with an event notification, as described elsewhere herein. For example, the transponder reader 320 may include a mobile device (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a scanning tool, or a similar type of device. As another example, the transponder reader 320 may include a barcode tag reader (e.g., a one-dimensional barcode reader, a two-dimensional barcode reader, etc.), a Bluetooth tag reader, a Bluetooth Low Energy tag reader, a RFID tag reader, a QR code tag reader, a RuBee tag reader, a NFC tag reader, and/or the like. In some implementations, the transponder reader 320 may query a transponder 330 and may receive an event notification and/or event data associated with an occurrence of an event in response to the query, as described elsewhere herein.

The transponder 330 includes one or more devices capable of receiving, generating, storing, processing, and/or providing information associated with an event notification, as described elsewhere herein. For example, transponder 330 may include a transceiver, a separate transmitter and receiver, a memory, and/or the like. In some implementations, transponder 330 may receive an event identifier from a control system and may store the event identifier in a portion of a unique identifier of the transponder 330, as described elsewhere herein. Additionally, or alternatively, transponder 330 may receive a query from the transponder reader 320 and may provide the event identifier to the transponder reader 320, as described elsewhere herein.

The sensor 340 includes one or more devices capable of sensing characteristics associated with an area (e.g., a characteristic of a physical environment, a characteristic of objects located on a shelf, and/or the like. Sensor 340 may include one or more integrated circuits (e.g., on a packed silicon die) and/or one or more passive components of one or more flex circuits to enable communication with one or more components of device 400.

The sensor 340 may include a magnetometer (e. g., a Hall effect sensor, an anisotropic magnetoresistive (AMR) sensor, a giant magneto-resistive sensor (GMR), and/or the like), a location sensor (e. g., a global positioning system (GPS) receiver, a local positioning system (LPS) device (e.g., that uses triangulation, multi-lateration, etc.), and/or the like), a gyroscope (e. g., a micro-electro-mechanical systems (MEMS) gyroscope or a similar type of device), an accelerometer, a speed sensor, a motion sensor, an infrared sensor, a temperature sensor, a pressure sensor, and/or the like.

The control system 350 includes one or more devices capable of receiving, generating, storing, processing, and/or providing information associated with an event notification, as described elsewhere herein. For example, the control system 350 may include computer hardware and/or software to obtain sensor readings from sensor 340, determine an occurrence of an event based on the sensor readings, provide an event identifier associated with the event to the transponder, and/or cause the transponder to restore a unique identifier of the transponder, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
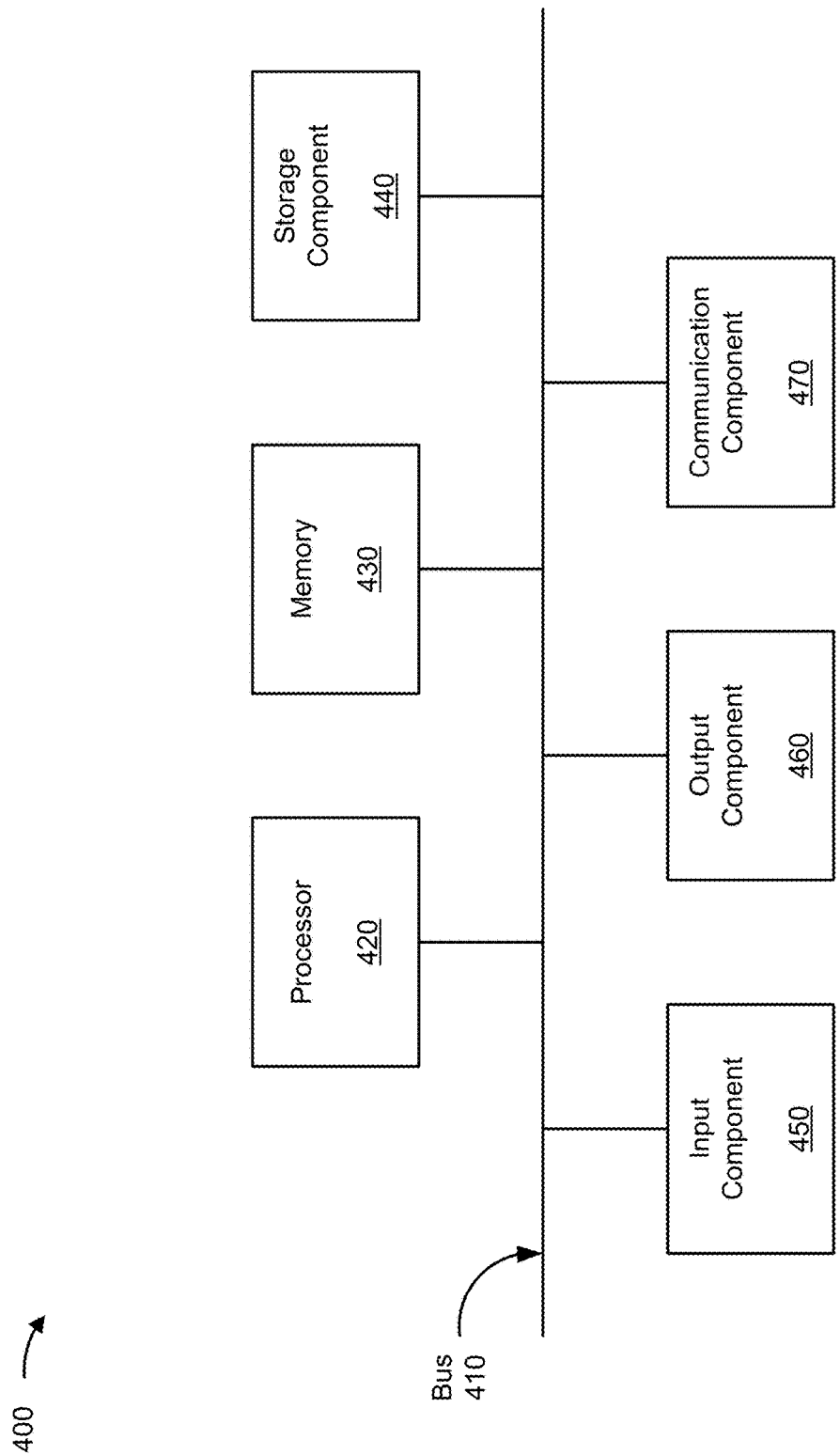
FIG. 4 is a diagram of example components of one or more devices of FIG. 3.

FIG. 4 is a diagram of example components of a device 400, which may correspond to user device 310, transponder reader 320, transponder 330, sensor 340, and/or control system 350. In some implementations, user device 310, transponder reader 320, transponder 330, sensor 340, and/or control system 350 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
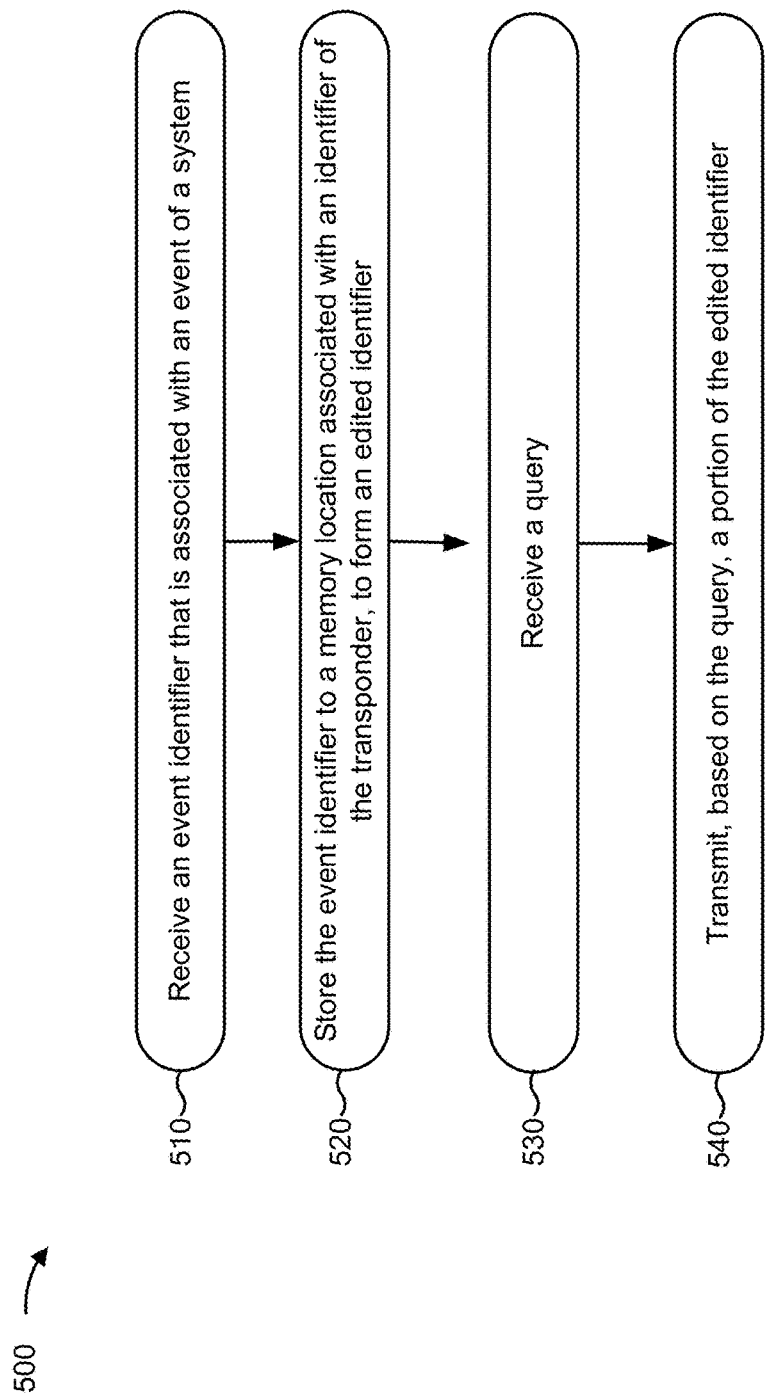
FIG. 5 is a flowchart of an example process relating to event notification based on editing a transponder identifier.

FIG. 5 is a flowchart of an example process 500 associated with event notification based on editing a transponder identifier. In some implementations, one or more process blocks of FIG. 5 may be performed by a transponder (e.g., transponder 330). In some implementations, one or more process blocks of FIG. 5 may be performed by another device or a group of devices separate from or including the transponder, such as a transponder reader (e.g., transponder reader 320), a sensor (e.g., sensor 340), and/or a control system (e.g., control system 350). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving an event identifier that is associated with an event of a system (block 510). For example, the transponder may receive an event identifier that is associated with an event of a system, as described above.

As further shown in FIG. 5, process 500 may include storing the event identifier to a memory location associated with an identifier of the transponder, to form an edited identifier (block 520). For example, the transponder may store the event identifier to a memory location associated with an identifier of the transponder, to form an edited identifier, as described above. The transponder may comprise an RFID transponder and the identifier may comprise a rewriteable unique identifier of the RFID transponder. The transponder may store the event identifier by overwriting a particular portion of the identifier with the event identifier.

In some implementations, the identifier comprises a unique identifier of the system. The event may be associated with a sensor that is associated with the transponder and a portion of the unique identifier permits the system to determine that the sensor is associated with the event.

As further shown in FIG. 5, process 500 may include receiving a query (block 530). For example, the transponder may receive a query, as described above. In some implementations, the query comprises a masking query from a transponder reader. The masking query may include a truncation identifier and the event identifier in a portion of the masking query that corresponds to the portion of the edited identifier that includes the event identifier.

The event identifier may correspond to a priority scheme for a severity of the event associated with a plurality of different types of events. The transponder reader may be configured to query the transponder according to the priority scheme.

As further shown in FIG. 5, process 500 may include transmitting, based on the query, a portion of the edited identifier (block 540). For example, the transponder may transmit, based on the query, a portion of the edited identifier, as described above. The portion of the edited identifier may comprise the event identifier to indicate that a sensor, associated with the transponder, detected the event. Prior to receiving the query, the transponder may store, in a reconfigurable memory of the transponder, event data associated with the event notification. After transmitting the portion of the edited identifier, the transponder may transmit the event data to a transponder reader that provided the query.

In some implementations, the portion of the edited identifier may be a first portion of the edited identifier. When transmitting the portion of the edited identifier, the transponder may transmit the first portion of the edited identifier that includes the event identifier as a first response to the query and transmitting a second portion of the edited identifier as a second response that indicates a particular sensor that detected the event.

In some implementations, the transponder may receive a reset notification. The transponder may re-edit the edited identifier to transform the edited identifier into the identifier based on receiving the reset notification. In some implementations, prior to editing the identifier, the transponder may store an overwritten portion of the identifier that is overwritten to include the event identifier. When returning the edited identifier to the identifier, the device may overwrite the event identifier to include the overwritten portion.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with event notification based on editing a transponder identifier. In some implementations, one or more process blocks of FIG. 6 may be performed by a control system (e.g., control system 350). In some implementations, one or more process blocks of FIG. 6 may be performed by another device or a group of devices separate from or including the transponder, such as a transponder reader (e.g., transponder reader 320), a transponder (e.g., transponder 330), and/or a sensor (e.g., sensor 340). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include detecting an event associated with a sensor (block 610). For example, the device may detect an event associated with a sensor, as described above. When detecting the event, the device may receive a sensor reading from the sensor. The sensor reading may correspond to the event identifier of the event. The device may compare the sensor reading to a threshold associated with the event. The device may detect that the event occurred based on the sensor reading satisfying the threshold.

In some implementations, the sensor is configured to provide a sensor reading that is associated with at least one of a presence of an object, a placement of an object, or a quantity of a plurality of objects that are associated with the object.

As further shown in FIG. 6, process 600 may include identifying a transponder associated with the sensor (block 620). For example, the device may identify a transponder associated with the sensor, as described above.

As further shown in FIG. 6, process 600 may include causing the transponder to store an event identifier in a memory location of an identifier, of the transponder, to form an edited identifier (block 630). For example, the device may cause the transponder to store an event identifier in a memory location of an identifier, of the transponder, to form an edited identifier, as described above. In some implementations, the event identifier is associated with an event.

The identifier of the transponder may comprise a unique identifier of a system that is configured to monitor the sensor. When causing the transponder to store the event identifier, the device may identify a particular portion of the unique identifier that is configured to include the event identifier. The device may overwrite, in the memory location, the particular portion to include the event identifier. In some implementations, the device may cause the transponder to restore the identifier to the memory location after the transponder responds to the query.

As further shown in FIG. 6, process 600 may include determining that the transponder responded to a query from a transponder reader (block 640). For example, the device may determine that the transponder responded to a query from a transponder reader, as described above. The transponder reader may be configured to query the transponder using the event identifier according to a schedule. The device may determine that the transponder reader received the event identifier. For example, the device may determine according to the schedule that the transponder reader queried the transponder using the identifier. When determining that the transponder responded to the query, the device may read the memory location, determine that the identifier was restored to the memory location, and determine that the transponder responded to the query based on the identifier being restored to the memory location.

As further shown in FIG. 6, process 600 may include storing a confirmation that the event identifier was provided to the transponder reader via the transponder (block 650). For example, the device may store a confirmation that the event identifier was provided to the transponder reader via the transponder, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, etc., depending on the context.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method, comprising:
   receiving, by a transponder, an event identifier that is associated with an event of a system;
   storing, by the transponder, the event identifier to a particular portion of a memory location associated with an identifier of the transponder, to overwrite a portion of the identifier of the transponder and form an edited identifier of the transponder,
   storing, to another memory location of the transponder, the overwritten portion of the identifier of the transponder;
   receiving, by the transponder, a query; and
   transmitting, by the transponder and based on the query, a portion of the edited identifier.

2. The method of claim 1, wherein storing the event identifier comprises:
   overwriting a particular portion of the identifier with the event identifier.

3. The method of claim 1, wherein the query comprises a masking query from a transponder reader,
   wherein the masking query includes a truncation identifier and the event identifier in a portion of the masking query that corresponds to the portion of the edited identifier that includes the event identifier.

4. The method of claim 1, wherein the identifier comprises a unique identifier of the system,
   wherein the event is associated with a sensor that is associated with the transponder, and
   wherein a portion of the unique identifier permits the system to determine that the sensor is associated with the event.

5. The method of claim 1, further comprising:
   prior to receiving the query, storing, in a reconfigurable memory of the transponder, event data associated with the event identifier; and
   after transmitting the portion of the edited identifier, transmitting the event data to a transponder reader that provided the query.

6. The method of claim 1, wherein the portion of the edited identifier comprises the event identifier to indicate one or more of:
   that a sensor, associated with the transponder, detected the event, or
   a status of the sensor,
   wherein the status indicates a readiness associated with transmission of data associated with one or more of: a firmware update, an image captured by the sensor, a backhaul process.

7. The method of claim 1, wherein the portion is a first portion of the edited identifier, and wherein transmitting the portion of the edited identifier comprises:
   transmitting the first portion of the edited identifier that includes the event identifier as a first response to the query; and
   transmitting a second portion of the edited identifier as a second response that indicates a particular sensor that detected the event.

8. The method of claim 1, further comprising:
   receiving a reset notification; and
   re-editing the edited identifier to transform the edited identifier into the identifier, based on the overwritten portion of the identifier stored in the other memory location.

9. The method of claim 1, wherein the transponder comprises a radio frequency identification (RFID) transponder and the identifier comprises a rewriteable unique identifier of the RFID transponder.

10. A device, comprising:
    one or more memories; and
    one or more processors, communicatively coupled to the one or more memories, configured to:
    detect an event associated with a sensor;
    identify a transponder associated with the sensor;
    cause the transponder to (i) store an event identifier in a memory location of an identifier, of the transponder, to overwrite a portion of the identifier of the transponder and form an edited identifier of the transponder, and (ii) store, to another memory location of the transponder, the overwritten portion of the identifier of the transponder;

wherein the event identifier is associated with the event;

determine that the transponder responded to a query from a transponder reader; and store a confirmation that the event identifier was provided to the transponder reader via the transponder.

11. The device of claim 10, wherein the one or more processors, when detecting the event, are configured to:
receive a sensor reading from the sensor,
wherein the sensor reading corresponds to the event identifier of the event.

12. The device of claim 10, wherein the one or more processors, when detecting the event, are configured to:
receive a sensor reading from the sensor;
compare the sensor reading to a threshold associated with the event; and
detect that the event occurred based on the sensor reading satisfying the threshold.

13. The device of claim 10, wherein the one or more processors, when determining that the transponder responded to the query, is configured to:
read the memory location;
determine that the identifier was restored to the memory location; and
determine that the transponder responded to the query based on the identifier being restored to the memory location.

14. The device of claim 10, wherein the identifier of the transponder comprises a unique identifier of a system that is configured to monitor the sensor,
wherein the one or more processors, when causing the transponder to store the event identifier, are configured to:
identify a particular portion of the unique identifier that is configured to include the event identifier; and
overwrite, in the memory location, the particular portion to include the event identifier.

15. The device of claim 14, wherein the one or more processors, when causing the transponder to store the event identifier, are configured to:
cause the transponder to restore the identifier to the memory location after the transponder responds to the query, based on the overwritten portion of the identifier stored in the other memory location.

16. A system, comprising:
a sensor configured to generate sensor readings associated with an object;
a transponder associated with the object,
wherein the transponder is configured to transmit an identifier;
a transponder reader that is configured to query the transponder using the identifier; and
a controller configured to:
detect, based on the sensor readings, an event associated with the object;
edit the identifier, of the transponder, to overwrite a portion of the identifier of the transponder in a memory location of the transponder and form an edited identifier that includes an event identifier that is associated with the event;
store, to another memory location of the transponder, the overwritten portion of the identifier of the transponder;
determine that the transponder reader received the event identifier from the transponder; and
return the edited identifier to the identifier.

17. The system of claim 16, wherein the event identifier corresponds to a priority scheme for a severity of the event associated with a plurality of different types of events,
wherein the transponder reader is configured to query the transponder according to the priority scheme.

18. The system of claim 16, wherein the sensor system comprises a sensor that is configured to provide a sensor reading that is associated with at least one of:
a presence of the object;
a placement of the object; and
a quantity of a plurality of objects that are associated with the object.

19. The system of claim 16, wherein the transponder reader is configured to query the transponder using the event identifier according to a schedule,
wherein the controller, when determining that the transponder reader received the event identifier, is configured to:
determine, according to the schedule, that the transponder reader queried the transponder using the event identifier.

20. The system of claim 16, wherein the controller is configured to:
when returning the edited identifier to the identifier, overwrite the event identifier to include the overwritten portion stored in the other memory location.

* * * * *